United States Patent
Warren et al.

[15] 3,650,400
[45] Mar. 21, 1972

[54] OPTICAL SENSING SYSTEM USABLE IN AMBIENT LIGHT

[72] Inventors: Charles W. Warren, Basking Ridge; Richard J. Izdebski, Somerset, both of N.J.

[73] Assignee: American Cyanimid Company, Stamford, Conn.

[22] Filed: Feb. 9, 1970

[21] Appl. No.: 9,589

[52] U.S. Cl. ..............................209/111.5, 250/71 R
[51] Int. Cl. .................................................B07c 5/342
[58] Field of Search .................209/111.5, 111.7, 111.6; 250/71 R, 83.3 UV

[56] References Cited

UNITED STATES PATENTS

| | | | |
|---|---|---|---|
| 3,207,830 | 4/1962 | Yaeger | 250/71 X |
| 3,105,908 | 10/1963 | Burkhardt | 250/83.3 UV |
| 3,169,186 | 2/1965 | Howard | 250/71 |
| 3,483,388 | 12/1969 | Ogle | 250/71 X |
| 3,484,606 | 12/1969 | Masi | 250/71 |
| 3,505,524 | 4/1970 | Hjerten | 250/83.3 UV |

Primary Examiner—Richard A. Schacher
Attorney—Bryan, Parmelee, Johnson & Bollinger

[57] ABSTRACT

A detection system, unaffected by ambient light, is provided for sensing the presence of luminescent material on labels, packages, and other articles. An ultraviolet light is pulsed at a predetermined frequency, and a photo-detector system is filtered to respond only to resulting radiations having that same pulse rate frequency. Control circuitry is provided for sorting packages and the like in response to readings of the detector.

21 Claims, 5 Drawing Figures

Patented March 21, 1972 3,650,400

INVENTORS
CHARLES W. WARREN
RICHARD J. IZDEBSKI

BY Robertson, Bryan,
Parmelee & Johnson.
ATTORNEYS 3,650,400

OPTICAL SENSING SYSTEM USABLE IN AMBIENT LIGHT

BACKGROUND OF THE INVENTION

In many industries, such as the pharmaceutical industry, it is important to be sure that the proper label is affixed to the products which are produced. While the labels may have been applied to the containers by hand or by machine, precautions must be taken to assure the reliability of such labeling. Labels and package markings are also used to sort articles on a conveyor.

One of the methods used in the past, of course, is a human observer. Such a method is only as fast and reliable as the human observer himself. Devices using photocell detectors have been used to check the reliability of the labeling that has been applied to containers.

It is, however, difficult for photosensitive detectors to differentiate between the light of luminescent materials and that of the surrounding room. Thus, when photocells have been used with luminescent material, it has been best to operate the system in a darkened area. For example, the bottles on a conveyor belt, passed through a darkened tunnel in which the photosensitive detectors were located. Since it was best to isolate the system so as to prevent unwanted light from entering, the operator could not readily observe and control the operation, and, if problems occurred inside the tunnel, partial disassembly of the machine was necessary in order to get at the source of the problem.

SUMMARY OF THE INVENTION

Our invention concerns a system for the detection of radiation from a container or the label of a container which has been coated or treated with luminescent materials. It differs from the prior art by utilizing a pulsating, rather than a constant, source of ultraviolet light and a corresponding photo-detector amplifier combination which is responsive to luminescent radiations of a predetermined pulse frequency. Some of the advantages of our system are that it permits operation in ambient light, that it permits the use of luminescent materials which are normally invisible in ordinary daylight and therefore will not affect the appearance of the label, and that it permits an increase in the speed and accuracy of the checking operation.

Our apparatus operates in ambient light to identify and sort objects as they are presented serially to an inspection station. The detection system is composed of a pulsating light source which emits ultraviolet light at a predetermined pulse frequency and a photo-detector system which will respond to pulsed radiations of only that pulse frequency. The limited response results from use of a band-pass filter in the detector's amplifier.

The photo-detector and the ultraviolet light source are arranged with respect to the articles on the conveyor so that the ultraviolet lamp will direct pulsating ultraviolet light upon articles as they pass by on the conveyor and so that the photo-detector can detect luminescent markings on them. If the article has been properly labeled with luminescent material, the label on the bottle will luminesce, that is, emit visable light radiations which are thereafter sensed by the photo-detector. These radiations will pulse at a frequency which is the same as that of the pulsating ultraviolet lamp. Upon sensing light radiations of the proper pulse frequency, the photo-detector amplifier will generate a control signal which is thereafter utilized to activate an accept mechanism. Steady light or light of other pulse frequency is rejected by the photo-detector amplifier circuit.

In the preferred embodiment, an ultraviolet light source and associated photo-detector means are positioned on each side of a conveyor belt so that the label, no matter what its position may be, will be exposed to said light source and sensed. In this embodiment, the ultraviolet light sources should each pulse at a frequency different from that of the other source. This eliminates possible "cross-talk", i.e., the actuation of a photo-detector sensor by the ultraviolet light itself on the opposite side of the conveyor. Each channel can thus be operated at high sensitivity since it does not "see" the opposing source.

The control signal may be utilized to operate an accept-reject mechanism or other function. If a bottle is to be accepted, a plunger moves the bottle to a different position on the conveyor belt so as to prevent its removal at a later point.

Phosphorescent and fluorescent materials have been used for coding purposes, with each being detected in the presence of the other. One circuit is shown in Halverson U.S. Pat. No. 3,412,245, "Method and Apparatus of Retrieval of Coded Information from Symbols Having Coded Inks Having Photoluminescent Components With Short and Long Time Constants of Decay After Short Wave Illumination." In that patent the pulse frequency is so chosen that the short time constant components give an alternating current signal, and the long time constant components give a direct current signal, even if the wavelengths are too close to separate optically.

THE DRAWINGS

DETAILED DESCRIPTION OF THE INVENTION

A label detection system has been provided which can be operated in ambient light. The major parts of the system are an ultraviolet light source, which directs pulsating ultraviolet light upon labels affixed to the bottles, and a photo-detector which will sense the luminescent radiations that are thereby produced. The photo-detector circuitry, responsive only to the pulse frequency of the ultraviolet light radiations, will activate the system when a bottle with luminescent material on it passes in front of the ultraviolet light source.

Figure 1:
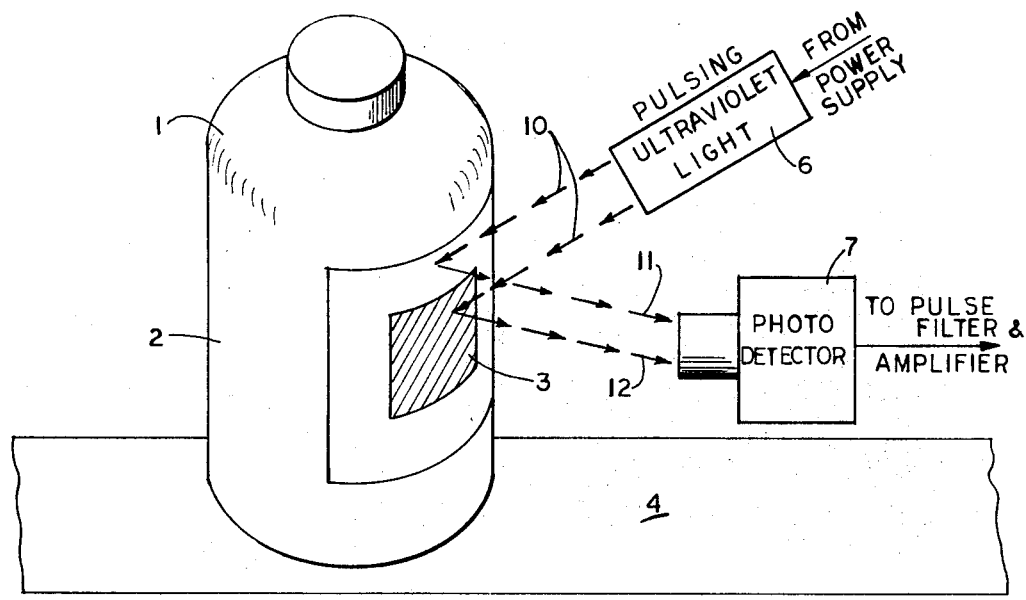
FIG. 1 is a perspective view showing principles of our invention in its simplest form.

FIG. 1 shows an article passing the detector system of our invention. The article could be any of numerous items such as packages, letters, and the like. For purposes of illustration, we have shown a bottle 1 bearing a label 2, the label having on it a spot of luminescent material 3. The bottle is shown on a conveyor belt 4.

Adjacent bottle 1 is a source of ultraviolet radiation, such as lamp 6. Lamp 6 and detector 7 are so positioned relative to bottle 1 as to illuminate label 2 and to sense the resulting radiations, if any, from label 2. By way of illustration, a series of arrows 10 are used to show the ultraviolet light from lamp 6; and a second series of arrows 11 and 12 to show, respectively, reflections of any visible light off the bottle surface and emitted radiations from luminescent material 3. The radiations are those which would be caused by the ultraviolet light striking the luminescent material 3.

Figure 2:
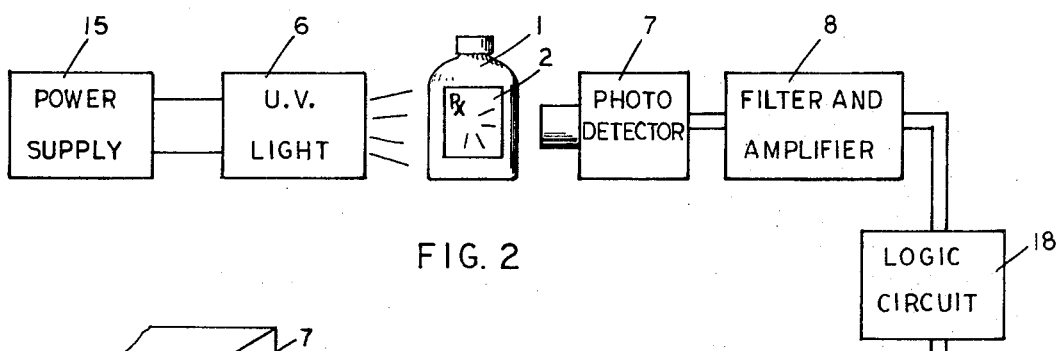
FIG. 2 is a schematic representation of apparatus which will indicate whether or not an object has been properly labeled.

As shown in FIG. 2, lamp 6 has a power supply 15 adapted to pulse or flicker the light at a predetermined frequency. Similarly, photo-detector 7 has associated circuitry 8 to filter and amplify the signal received by the detector. The filter is one, such as a band-pass filter, that will pass only signals of the same pulse frequency as that of the lamp 6. Signals of other frequencies are rejected.

In operation, bottle 1 is carried by belt 4 to a position adjacent lamp 6 and detector 7. Pulses of ultraviolet light of the predetermined frequency shine upon label 2 and, if luminescent material is present, it will emit light radiations. Since the ultraviolet light is pulsed, the emitted radiations (conveniently visible light) will be pulsed at the same frequency.

The pulse frequency for operation of the light may vary over a wide range, up to about 20,000 hertz, but preferably is between 400 and 6,000 hertz. A limitation on the pulse frequencies that can be utilized is that which is placed on the upper frequencies by the relaxation time of the luminescent materials. The relaxation time is the amount of time that is required for the luminescent material to return from a luminous to a non-luminous condition. When the dark time of the pulse is less than that of the relaxation time, that is, more than one pulse of ultraviolet light occurs before the energized luminescent material returns to its non-energized state, the apparatus will become less efficient.

Another limitation on pulse frequencies would arise if there were similar frequencies, including harmonics, in the surrounding ambient light, coming, for example, from the presence of a fluorescent lamp. Under such circumstances, the ultraviolet light pulsing frequency should be different from the ambient frequency and not harmonically related.

Photo-detector 7 is disposed adjacent to bottle 1 and to the ultraviolet light source 6 so that it will detect the luminescent radiations which are produced by material 3 on the label 2. Photo-detector 7, which is coupled with the filter and amplifier system, is designed to generate a control signal only upon sensing radiations of the proper pulse frequency.

It will become apparent that photo-detector 7 will also sense any visible light 11 emitted by ultraviolet light source 6 which has been reflected off the surface of the label or bottle. While these reflections are of low intensity, they, of course, would be of the proper frequency required to energize the photo-detector 7. In order to ensure the reliability of the operation, it is necessary to render the detection apparatus insensitive and therefore unresponsive to said signals. This is accomplished by adjusting the gain or threshold of the amplifier so that signals below a predetermined threshold level are not amplified. Therefore, while the photo-detector remains responsive to luminescent radiations of the proper frequency, the effect of the reflected visible ultraviolet light is eliminated.

This problem of background radiation can also be minimized by selecting light sources having little or no visible components, or by using filters to eliminate them.

In addition, ambient light, which could be daylight or could come from an incandescent lamp, may reach the photo-detector either directly or by reflection from label 2. Since the ambient light is effectively in a steady-state condition, that is, it does not pulsate or flicker, photocell detector 7 and its related circuitry will not generate a control signal. Comparably, the ultraviolet light source may not extinguish completely between pulses. Under these circumstances the emitted radiation may contain un unwanted steady-state, DC component. This however, will not affect the detector, though the lower the steady state signal, the better the signal-to-background ratio.

There may be present in the operational area a pulsating source of light, such as a fluorescent lamp. This could activate the system if its flicker or pulse frequency were the same as that of the ultraviolet light source. It is, therefore, necessary that the system have a flicker frequency which is not the same as, or harmonically related to, the frequency of any ambient light.

The output of filter and amplifier 8 is fed to logic circuitry 18, and the output thereof to any desired form of control unit 19. The logic circuitry 18 may be programmed as desired to actuate control 19. For example, it can sort articles on conveyor 4 by either moving the accepted articles to an "accept" position or by moving the rejected articles to a "reject" position thereby leaving, in each case respectively, the rejected or accepted article in its original position on the conveyor.

Figure 3:
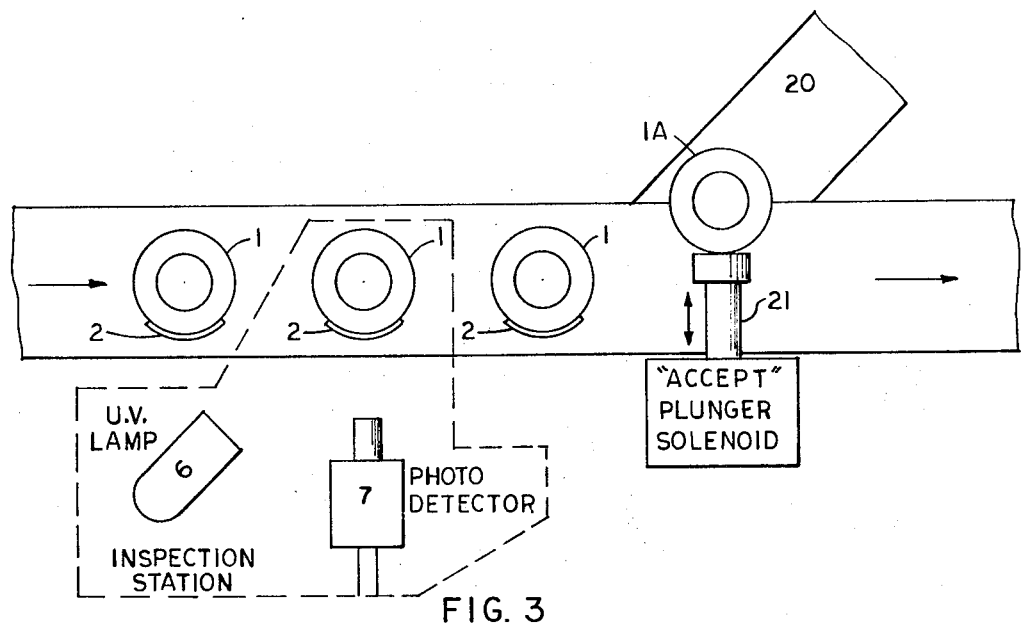
FIG. 3 is a plan view of a possible industrial application of our invention.

FIG. 3 shows a plan view of a possible industrial application of our system. Conveyor belt 4 is arranged to carry bottles bearing labels 2 past the ultraviolet light source 6 and photo-detector 7. As the bottles move on conveyor belt 4 they pass ultraviolet light source 6, which directs pulsating ultraviolet light upon the bottles and their labels. If the labels carry the proper luminescent material, they will emit radiation at a pulse frequency which is the same as that of source 6.

By way of example of uses to which our system may be put, control 19 is illustrated in FIG. 3 as an "accept" device, such as solenoid, which is positioned adjacent to conveyor belt 4 and opposite "accept" chute 20. When radiations of the proper pulse frequency are sensed by detector 7, a control signal is generated which actuates a plunger or other device 21 to push the bottles from the conveyor belt into "accept" chute 20, thus providing a "fail-safe" detection system. In FIG. 3, bottle 1A is shown being accepted.

Figure 4:
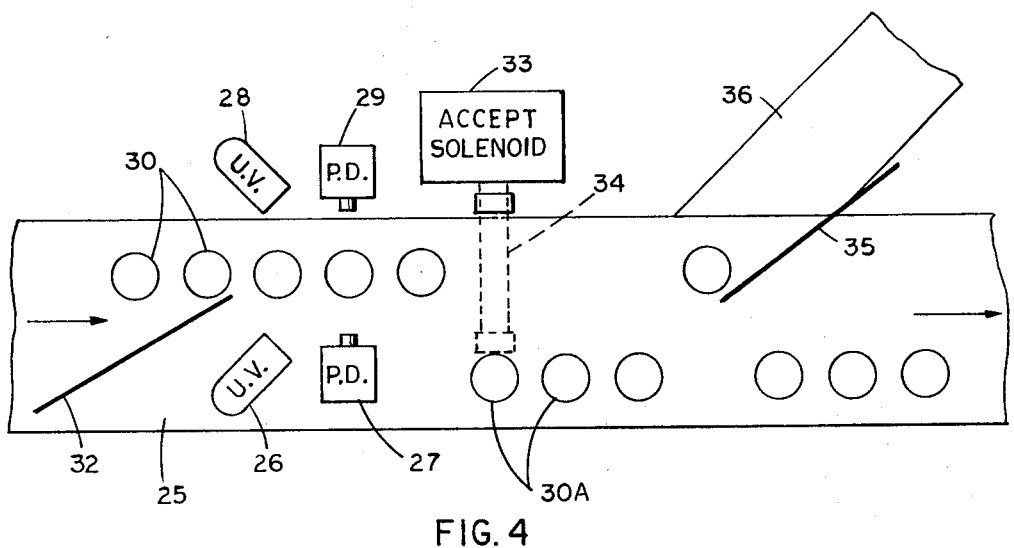
FIG. 4 is a plan view of the preferred embodiment of our apparatus.

FIG. 4 is a plan view of a preferred embodiment of our detection system. In this embodiment, an ultraviolet source and associated photo-detector are on each side of a conveyor belt 25. Thus, lamp 26 and detector 27 are on one side and lamp 28 and detector 29 on the other. This permits illumination and detection of the label, no matter in what direction the bottle is facing.

Also shown in FIG. 4 a guide or throat 32 is located before the detection area to direct the bottles 30 to one side of belt 25. In the detection area, an "accept" solenoid 33 and plunger 34 move the bottles to the other side of belt 25. A reject guide 35 and associated chute 36 remove the bottles which have not been moved by plunger 34. Solenoid 33 and plunger 34 are actuated by signals from a logic circuit (not shown) which in turn is controlled by signals from the photo-detectors 27 and 29. This control is the same as that shown in FIG. 2, except that the logic circuit may be actuated by a signal from either of the said two detectors.

In operation bottles 30 on conveyor belt 25, enter the detection region after passing throat 32. Belt 25, in effect, has two lines or positions for bottles 30, a "reject" line and an "accept" line and, if properly labeled, the bottles are moved by plunger 34 from the "reject" line to the "accept" line. Such motion is shown by the dotted outline of plunger 34. If the bottles are not so "accepted" they remain on the "reject" line, hit reject guide 35 and pass off belt 25 by chute 26. Thus, only bottles bearing proper luminescent markings are permitted to remain on belt 25.

As discussed above, lamps 26 and 28 are positioned on each side of the conveyor belt 25 so as to direct ultraviolet light upon the labels in whatever position or location they may be. Each of the ultraviolet light sources generates light at a pulse frequency different from that of the other sources. Comparably, the two detector amplifier combinations will accept only the pulse frequency of their respective lamps. Detector amplifier 27 will accept only the pulse frequency of lamp 26; and detector amplifier 29 that of lamp 28. By using two separate pulse frequencies, any possibility of the light from a lamp on one side of the conveyor affecting the detector amplifier combination on the other side is eliminated.

THE CIRCUITRY

The circuitry of the detection system is shown in FIG. 2 and may be of any desired type that will accomplish the desired function.

The operation of the system is as follows.

Power supply 15 provides the power for light 6 and determines the pulse frequency at which the ultraviolet light will operate. Lamp 6 will cause the luminescent material, if present, to emit radiation which will be detected by photo-detector 7. A photosensitive transistor may serve as the photo-detector. The output signals from detector 7 pass to filter and amplifier circuit 8 which will amplify only those signals of the said predetermined pulse frequency, i.e., the only radiations that will cause the generation of a control signal are those of the predetermined pulse frequency. This can be accomplished, for example, by using a band-pass filter in conjunction with the amplifier, so that frequencies other than the selected frequency are rejected. The output signal is transmitted from the amplifier and filter circuit 8 to the logic circuit 18. When it receives a signal, logic circuit 18 operates, as programmed, to actuate a mechanical control 19. In its simplest form, logic circuit 18 will be a simple "accept" - "reject" circuit, and control 19 will be a solenoid actuating a plunger, as for example in the embodiment of FIG. 4.

As discussed, the system of FIG. 4 contains two ultraviolet light sources and two photosensitive detectors. Under these circumstances, logic circuit 18 will have two inputs, either one of which can actuate it.

USE OF PARTICULAR LUMINESCENT MATERIALS

Luminescent materials have been developed that, when energized from an ultraviolet light source, will radiate light energy within a narrow bandwidth of wavelengths. The wavelength at which a particular luminescent material will radiate light energy is unique to that particular material and is, therefore, characteristic of the material. It is, therefore, possible to identify an object, which has been coated with the said luminescent material, by identifying the wavelength of the luminescent radiations.

To avoid possible confusion in this discussion, it is necessary to distinguish between two frequencies: the flicker or pulse frequency of the ultraviolet light and the frequency of the luminescent radiations. The frequency of the luminescent radiations is concerned only with the wavelength of the luminescent light, usually in the visible region, while the pulse frequency deals with the frequency at which this light pulses. For convenience, and to reduce confusion, the luminescent frequency is converted to wavelength, and so referred to herein.

Figure 5:
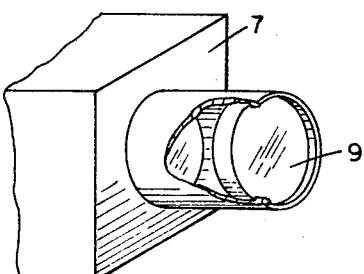
FIG. 5 is a perspective view of an optical filter used in conjunction with a photo-detector.

To make maximum use of these narrow-band luminescent materials, it is necessary that any label identification apparatus distinguish not only the proper pulse frequency, but also the proper wavelength of the luminescent light itself. Since the wavelengths of the luminescent radiations are within or close to the visible light spectrum, an ordinary optical filter, passing only a specific narrow-band width of wavelengths, provides a simple means for adapting this system for this application. The means for adapting the system is shown in FIG. 5 wherein the optical filter 9 is placed over the photo-detector 7. With such an optical filter over the photo-detector only light of a selected wavelength is sensed by said photocell. Thus, no control signal will be generated unless luminescent radiations from the particular narrow-band luminescent material are present. Use of a series of such materials, together with a corresponding series of detectors, permits multiple outputs. It is only necessary to program the logic circuitry accordingly.

Preferably both the filter for the pulse amplifier and the optical filter are restricted to pass just the chosen pulse frequency and wavelength. From communication theory, the narrower the band-pass, the greater the rejection of random noise, and the more improved is the signal-to-noise ratio. By having a narrow band-pass, a high level of ambient light generates only a very small "noise", and a modest ultraviolet source and small luminescer areas give a reliable detection system. In pharmaceutical work particularly, complete reliability is mandatory. It is far better to reject many good articles than to pass a single defective item.

When the ultraviolet lamp directs pulsating ultraviolet light upon the container, the luminescent material of the label will radiate light energy. For the pulsed luminescent radiation to be sensed by the photocell, two conditions must be fulfilled:

1. the wavelength of the luminescent light must be within the narrow band of wavelengths passed by the optical filter, and,
2. the pulse frequency of the luminescent light must be the same as that of the pulsating ultraviolet light source.

Because these narrow-band luminescent materials emit radiations over a narrow bandwidth, characteristic of that particular composition, it is possible for the label detection device to distinguish between bottles labeled with different luminescent materials as well as determining whether or not any luminescent material has been applied to the bottle label.

Whereas the pulse frequency is conveniently determined by feeding pulses of electrical energy to an ultraviolet source, with the source being dark between pulses, a similar and equally useful source is a steady state ultraviolet source, with a mechanical chopper or pulser to cut off radiation from the source at a chosen frequency, or pulse rate. The illumination can be sinusoidal, square wave, sawtooth or of other configuration during the "on" and "off" time.

The terms "luminescence", "luminescent material", "luminescer", and words of similar import as used in this specification are used to indicate material which will emit radiant energy when exposed to ultraviolet light. Fluorescent and phosphorescent materials are included within the broad term "luminescent materials." Characteristically, luminescent materials will luminesce, that is, give off visible light radiation, when energized by a source of ultraviolet light. The decay time, or relaxation time, or half-life of the phosphorescent materials must be short enough for the luminescence to have a readily measurable pulse component.

Thus, it can be seen that a label detection device which will operate in ambient light has been provided. Also, with the addition of an optical filter, the apparatus is capable of distinguishing between bottles labeled with different luminescent materials. Therefore, by placing the proper luminescent coating on a label, it is possible to identify and separate improperly labeled bottles or other articles which have luminescent labels of a different chemical composition.

We claim:

1. A detection system which is capable of operating in ambient light to detect and sort articles marked with luminescent material, said detection system including:
    a. a pulsating, ultraviolet light source to direct ultraviolet light of a predetermined pulse frequency upon the said articles;
    b. a radiation detector amplifier combination in relation to said ultraviolet light source and said articles so as to receive and sense the radiations emitted from the said luminescent material, said radiation detector being adapted to generate a control signal only in response to the sensing of radiations of the said predetermined pulse frequency;
    c. a sorting mechanism associated with said radiation detector and responsive to the control signal produced by said radiation detector to sort the said articles, whereby articles may be sorted in ambient light on the basis of the markings thereon.

2. A detection system as in claim 1 wherein the said detector includes an electronic amplifier and filter circuit, said filter circuit blocking from the said amplifier circuit all signals other than signals of said predetermined pulse frequency.

3. A detection system as in claim 2 wherein the said amplifier circuit will amplify only signals with an intensity greater than a selected threshold intensity.

4. A detection system as in claim 1 including an optical filter associated with said radiation detector to allow radiations of only a predetermined wavelength to pass through to said radiation detector.

5. A detection system which is capable of operating in ambient light to detect and sort articles marked with luminescent material, said detection system including,
    a. a conveyor means to present said articles to the detection system;
    b. a pulsating, ultraviolet light source to direct ultraviolet light of a predetermined pulse frequency upon the said articles;
    c. a photo-detector disposed in relation to said ultraviolet light source and said article so as to receive and sense radiations emitted from said luminescent material;
    d. a discriminating circuit operatively associated with said photo-detector, and receiving the output therefrom to generate a signal only upon sensing radiations of the said predetermined pulse frequency; and,
    e. a sorting mechanism associated with said discriminating circuit responsive to said signal whereby articles may be sorted in ambient light on the basis of the presence or absence of luminescent material thereon.

6. A detection system as in claim 5 wherein the discriminating circuit includes an electronic filter and amplifier circuit wherein the filter does not pass to said amplifier pulse frequencies other than the selected predetermined pulse frequency, thereby enabling the discriminating circuit to generate a control signal only upon sensing radiations of the proper pulse frequency.

7. A detection system as in claim 5, wherein an optical filter is associated with said detector and the said optical filter is adapted not to pass light other than light of the selected wavelengths.

8. A detection system to determine the presence of an ultraviolet sensitive material located upon an object wherein an ultraviolet light source directs ultraviolet light of a predetermined pulse frequency upon the objects as they are presented to a detection station, said detection system including a photosensitive detector and a control circuit adapted to receive the output of said photosensitive detector, said control circuit being adapted to discriminate between pulse frequencies and to respond only to said predetermined pulse frequency by generating a signal in response thereto, whereby the presence or absence of said ultraviolet sensitive material on said object may be detected in ambient light.

9. A detection system as in claim 8 wherein the control circuit includes an electronic amplifier and filter circuit, said filter circuit blocking all signals from the said amplifier other than signals resulting from radiations of the proper predetermined pulse frequency.

10. A detection system as in claim 9 wherein the said amplifier will amplify only signals with an intensity greater than a selected threshold intensity.

11. A detection system as in claim 8 wherein a said predetermined pulse frequency at which the ultraviolet light source generates light and to which the apparatus is responsive is a frequency different from those frequencies of the ambient light.

12. A detection system as in claim 8 wherein a sorting mechanism is associated with said detector and control circuit and is responsive to the signal produced by the said control circuit.

13. A detection system as in claim 8 wherein an optical filter is associated with said photosensitive detector, whereby the said filter is adapted to block out light of those wavelengths other than selected wavelengths so that the photosensitive detector will sense only light of that selected wavelength.

14. A method of identifying and sorting, in ambient light, articles market with luminescent material, said method including:
 a. directing ultraviolet light of a predetermined pulse frequency upon the articles thereby causing the said luminescent material to emit radiation;
 b. detecting the said luminescent light radiation;
 c. generating a control signal only upon detecting luminescent radiations of the said predetermined pulse frequency; and,
 d. utilizing said control signal to sort and identify the said articles.

15. The method as claimed in claim 14, including:
 a. marking said articles with a luminescent material that will emit only light radiations of a characteristic wavelength; and,
 b. placing an optical filter in conjunction with said detector so as to block from said detector all light radiations other than those of the said characteristic wavelength.

16. A method of identifying articles in ambient light, said articles marked with luminescent material, said method including:
 a. marking said articles with luminescent material that will emit only light radiations of a characteristic wavelength;
 b. directing ultraviolet light of a predetermined pulse frequency upon the articles thereby causing the said luminescent material to emit luminescent light radiations;
 c. sensing for the presence of light radiations of the said characteristic wavelengths;
 d. determining if said light radiations of the said characteristic wavelength occur at the said predetermined pulse frequency;
 e. generating a signal only upon sensing light radiations of both the said predetermined pulse frequency and the said characteristic wavelength; and,
 f. utilizing said signal to identify said articles.

17. A method as set forth in claim 16 including the step of sorting said articles in accordance with said identification.

18. A detection system which is capable of operating in ambient light to detect and sort articles marked with luminescent material, said detection system including:
 a pulsating, ultraviolet light source to direct ultraviolet light of a predetermined pulse frequency upon the said articles;
 said ultraviolet light source including a plurality of ultraviolet light generators, each of which produces ultraviolet light at a pulse frequency different from that of the other generators;
 a radiation detector amplifier combination positioned in relation to said ultraviolet light source and said articles so as to receive and sense the radiations emitted from the said luminescent material, said radiation detector being adapted to generate a control signal in response to the sensing of radiations only of the said predetermined pulse frequency;
 said radiation detector amplifier combination including a plurality of radiation sensitive devices that will sense the presence of luminescent material located upon the said article no matter what its position may be; and
 a sorting mechanism associated with said radiation detector and responsive to the control signal produced by said radiation detector to sort the said articles, whereby articles may be sorted in ambient light on the basis of the markings thereon.

19. A detection system as in claim 18 wherein the said radiation sensitive devices are coupled together so as to provide one control signal upon the sensing of the emitted radiations by any one of said devices.

20. A detection system which is capable of operating in ambient light to detect and sort articles marked with luminescent material, said detection system including,
 a. a conveyor means to present said articles to the detection system;
 b. a pulsating, ultraviolet light source to direct ultraviolet light of a predetermined pulse frequency upon the said articles;
 c. a photo-detector disposed in relation to said ultraviolet light source and said article so as to receive and sense radiations emitted from said luminescent material;
 d. a discriminating circuit operatively associated with said photo-detector, and receiving the output therefrom to generate a signal only upon sensing radiations of the said predetermined pulse frequency; and,
 e. a sorting mechanism associated with said discriminating circuit responsive to said signal whereby articles may be sorted in ambient light on the basis of the presence or absence of luminescent material thereon
 f. said ultraviolet light source including a plurality of ultraviolet light generators each of which produces ultraviolet light at a pulse frequency different from that of the other generators.

21. A detection system as in claim 20, wherein the said radiation detector system consists of a plurality of photo-detectors which are coupled together so as to provide one control signal upon any one of said photo-detectors sensing the emitted luminescent radiations of the said predetermined pulse frequency.

* * * * *